(12) United States Patent
Kurlander et al.

(10) Patent No.: US 7,467,380 B2
(45) Date of Patent: Dec. 16, 2008

(54) INVOKING APPLICATIONS WITH VIRTUAL OBJECTS ON AN INTERACTIVE DISPLAY

(75) Inventors: David Joshua Kurlander, Seattle, WA (US); Joel P. Dehlin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1002 days.

(21) Appl. No.: 10/839,668

(22) Filed: May 5, 2004

(65) Prior Publication Data

US 2005/0251800 A1 Nov. 10, 2005

(51) Int. Cl.
*G06F 9/445* (2006.01)
(52) U.S. Cl. .................. 717/174; 717/175; 345/173; 345/174; 345/175
(58) Field of Classification Search ......... 345/156–160, 345/173–175; 705/26; 717/174–175
See application file for complete search history.

(56) References Cited

U.S. PATENT DOCUMENTS

| 4,992,650 | A | 2/1991 | Somerville | 235/462 |
|---|---|---|---|---|
| 6,977,643 | B2 * | 12/2005 | Wilbrink et al. | 345/156 |
| 7,134,756 | B2 * | 11/2006 | Drucker et al. | 353/77 |
| 7,259,747 | B2 * | 8/2007 | Bell | 345/156 |
| 2003/0126033 | A1 * | 7/2003 | Evans et al. | 705/26 |
| 2003/0132944 | A1 * | 7/2003 | Smith | 345/581 |
| 2004/0002903 | A1 * | 1/2004 | Stolfo et al. | 705/26 |
| 2004/0130501 | A1 * | 7/2004 | Kondo et al. | 345/1.1 |

OTHER PUBLICATIONS

"3.6 Interpolation in Two or More Dimensions." Numerical Recipes in C: The Art of Scientific Computing. Chapter 3. Interpolation and Extrapolation. © 1988-1992, Cambridge University Press. Numerical Recipes Software. pp. 123-128.
"Bar Code 1,2-Dimensional Bar Code Page." Available http://www.adams1.com/pub/russadam/stack.html. Printed Jan. 20, 2004. 14pp.
Ambiente article. "InteracTable®." Dated Jul. 7, 2000. Available http://www.darmstadt.gmd.de/ambiente/activities/interactable.html. Printed Nov. 21, 2003. 3pp.

(Continued)

*Primary Examiner*—Wei Y Zhen
*Assistant Examiner*—Junchun Wu
(74) *Attorney, Agent, or Firm*—Workman Nydegger

(57) ABSTRACT

One or more objects placed on a display surface of an interactive display system are identified by a camera that receives infrared light reflected back by the object(s) through the display surface. The interactive display system displays images on the display surface that are produced by software applications, as well as sensing objects placed proximate to the display surface. If object(s) that were placed on the display surface are identified and determined to be associated with a predefined software application, the application is automatically executed. Objects can be identified based upon shape, a pattern applied to the objects, a size of the object, or a location on the display surface where the object is placed. The object may be used in the software application after it is executed or may simply be bear a functional relationship to the software application.

25 Claims, 8 Drawing Sheets

OTHER PUBLICATIONS

Bier, Stone, Pier, Buston, and DeRose. "Toolglass and Magic Lenses: The See-Through Interface." *Proceedings of Siggraph '93* (Anaheim, August). Computer Graphics Annual Conference Series, ACM, 1993, pp. 73-80. 8pp.

Blickenstorfer, Conrad H. "First Look: Acer TravelMate TM100 with Windows XP Tablet PC Edition." Pen Computing Magazine. Jul. 2002. pp. 44-47.

"DiamondSpin—Begs for Direct Manipulation Technology Is it the Pen? Sony Leaps Out-of-the-Box Again with Gummi." Mitsubishi/ DiamondSpin. CHI 2004 #3. Printed Apr. 30, 2004. 5pp.

Dietz and Leigh. "DiamondTouch: A Multi-User Touch Technology." *UIST '01* Orlando FLA. © ACM 2001 1-58113-438-x/01/11. CHI Letters 3 (2). Nov. 11-14, 2001. pp. 219-226.

Electronic Check Alliance Processing, Inc. "Gift Cards, How Stored Value Card Systems Work." Available. http://www.electron-cap.com/GiftCards.htm. Printed Jan. 20, 2004 and May 16, 2004. © 2003. 2pp. total (3pp printed).

Fukuchi and Rekimoto. "Interaction Techniques for SmartSkin." *ACM UIST2002 demonstration*, 2002. 2pp.

Grabowski, Robert. "A Miniature Video Laser Range Finder for Small Robots." Available http://www.andrew.cmu.edu/~rjg/research/research_hardware/laser_rangefinder.html. Printed May 16, 2004.

Grant and Winograd. "Flexible, Collaborative Organization on a Tabletop." *ACM CSCW 2002: Workshop on Co-located Tabletop Collaboration: Technologies and Directions*. New Orleans, LA. Nov. 2002. pp. 1-4.

Horn, Berthold K. P. "Robot Vision." The MIT Press. Available http://mitpress.mit.edu/catalog/item/default.asp?ttype=2 &tid=8388. Printed Dec. 17, 2003. 6pp. total.

Horn, Berthold Klaus Paul. "Robot Vision." Binary Images: Topological Properties. The MIT Electrical Engineering and Computer Science Series. 1986. pp. 66-71 and cover page(s).

Hunter, Andrew. "Connected Components Analysis (Computer Vision)." www.google.com search results http://www.google.com/search?sourceid=navclient&q=connected+component+ellipse. Printed Mar. 7, 2004. article dated Sep. 24, 2002. 2pp search results, 21pp article.

"IR Distance Sensor." Available http://www.diyelectronics.com/Accessories/IRDS.html (2pp) and http://www.diyelectronics.com/Accessories/GP2D05.html (1pg). Printed Dec. 30, 2003. 3pp.

Ishii and Ullmer. "Tangible Bits: Towards Seamless Interfaces between People, Bits and Atoms." *Proceedings of CHI '97*, Mar. 22-27, 1997, Atlanta, Georgia. © 1997 ACM 0-89791-802-9/97/03. pp. 1-8.

Ishii, Wisneski, Orbanes, Chun, and Paradiso. "PingPongPlus: Design of an Athletic-Tangible Interface for Computer-Supported Cooperative Play." *Proceeding of CHI '99*, May 15-20, 1999, © 1999 ACM. pp. 1-8.

Johanson, Kolodny, and Russell. "A Hand pose and Position Tracker for the Interactive Table." CS223B Final Project. Available http://graphics.stanford.edu/~drussel/vision/tracker-report.html. Printed Dec. 16, 2003, 6pp.

Ju, Hurwitz, Judd, and Lee. "CounterActive: An Interactive Cookbook for the Kitchen Counter." *Extended Abstracts of CHI 2001*, Seattle. Apr. 2001. pp. 269-270.

Kang, Sing Bing. "Radial Distortion Snakes." *IAPR Workshop on Machine Vision Applications (MVA2000)*, Tokyo, Japan. Nov. 2000. pp. 603-606.

Kato, Billinghurst, Poupyrev, Imamoto, and Tachibana. "Virtual Object Manipulation on a Table-Top AR Environment." *IEEE and ACM Int'l Symposium on Augmented Reality 2000, ISAR '2000*, Oct. 5-6, 2000, Munich. 9pp.

Klemmer, Newman, and Sapien. "The Designer's Outpost: A Task-Centered Tangible Interface for Web Site Information Design." *Proceedings of Human Factors in Computing Systems: CHI 2000 Extended Abstracts*. The Hague, The Netherlands. Apr. 1-6, 2000. pp. 333-334.

Klemmer, Newman, Farrell, Bilezikjian, and Landay. "The Designers' Outpost: A Tangible Interface for Collaborative Web Site Design." *CHI Letters, The 14th Annual ACM Symposium on User Interface Soft Technology: UIST 2001*. 3(2). pp. 1-10.

Kobayashi, Hirano, Narita, and Ishii. "A Tangible Interface for IP Network Simulation." *CHI 2003*, Apr. 5-10, 2003, Ft. Lauderdale, FL ACM 1-58113-630-7/03/0004. 2pp.

Koike, Sato, and Kobayashi. "Integrating Paper and Digital Information on EnhancedDesk: A Method for Realtime Finger Tracking on an Augmented Desk System." *ACM Transaction on Computer-Human Interaction*, vol. 8 No. 4, Dec. 2001. © 2001 ACM 1073-0516/01/1200-0307. pp. 307-322.

Leibe, Starner, Ribarsky, Wartell, Krum, Singletary, and Hodges. "The Percestive workbench: Toward Spontaneous and Natural Interaction In Semi-Immercive Virtual Environments." *Proceedings of the IEEE Virtual Reality 2000 Conference*, Mar. 18-22, 2000. New Brunswick, New Jersey: IEEE Computer Society, 2000. 8pp.

Leigh and Dietz. "DiamondTouch Characteristics and Capabilities." Mitsubishi Electric Research Laboratories, Cambridge, Massachusetts, USA. Undated. 2pp.

Magerkurth, Stenzel, and Prante. "STARS—A Ubiquitous Computing Platform for Computer Augmented Tabletop Games." *5th International Conference on Ubiquitous Computing (Ubicomp '03)*, Oct. 12-15, 2003, Seattle, Washington. 2pp.

Malandain, Grégoire. "Connected Components Extraction." Available http://www-sop.inria.fr/epidaure/personnel/malandain/segment/connexe.html. Printed Dec. 18, 2003. 3pp.

Matsushita and Rekimoto. "HoloWall: Designing a Finger, Hand, Body, and Object Sensitive Wall." *UIST '97* Banff, Alberta, Canada. © 1997 ACM 0-89791-881-9/97/10. pp. 209-210.

Missouri Department Of Revenue. "2D Barcode Technology." Undated. 3pp.

Moran, Saund, van Melle, Gujar, Fishkin, and Harrison. "Design and Technology for Collaborage; Collaborative Collages of Information on Physical Walls." *UIST '99*. Asheville, NC. © 1999 ACM 1-58113-075-9/99/11, CHI Letters vol. 1, 1. pp. 197-206.

Pangaro, Maynes-Aminzade, and Ishii. "The Actuated Workbench: Computer-Controlled Actuation in Tabletop Tangible Interfaces." *Proceedings of UIST 2002*, Oct. 27-30, 2002. © ACM. 10pp.

Paradiso, Hsiao, Strickon, Lifton, and Adler. "Sensor systems for interactive surfaces." *IBM Systems Journal*, vol. 39, Nos. 3&4, 2000. pp. 892-914.

Patten, Ishii, Hines, and Pangaro. "Sensetable: A Wireless Object Tracking Platform for Tangible User Interfaces." *Proceedings of CHI 2001*, Mar. 31-Apr. 5, 2001, ACM Press, © ACM. 8pp.

Patten, Recht, and Ishii. "Audiopad: A Tag-based Interface for Musical Performance." *Proceedings of Conference on New Interface for Musical Expression (NIME '02)*. Dublin, Ireland, May 24-26, 2002. 6pp.

Ramos and Balakrishnan. "Fluid Interaction Techniques for the Control and Annotation of Digital Video." *UIST '03* Vancouver, B.C., Canada. © 2003 ACM 1-58113-636-06/03/0010. pp. 105-114.

Rekimoto and Ayatsuka. "CyberCode: Designing Augmented Reality Environments with Visual Tags." *Proc. of UIST 2000*, 2000. 10pp.

Rekimoto and Matsushita. "Perceptual Surfaces: Towards a Human and Object Sensitive Interactive Display." *Proceedings of Workshop on Perceptural User Interactes (PUI'97)*, 1997. 3pp.

Rekimoto and Nagao. "The World through the Computer: Computer Augumented Interaction with Real World Environments." *Proceedings of UIST'95*, 1995. pp. 29-36.

Rekimoto and Saitoh. "Augmented Surfaces: A Spatially Continuous Work Space for Hybrid Computing Environments." *CHI '99*, May 15-20, 1999. Pittsburgh, Pennsylvania. © ACM 1999 0-201-48559-1/99/05. pp. 378-385.

Rekimoto, Jun. "Matrix: A Realtime Object Identification and Registration Method for Augmented Reality." *Proc. of Asia Pacific Computer Human Interaction (APCHI '98)*, 1998. 6pp.

Rekimoto, Jun. "Multiple-Computer User Interfaces: 'Beyond the Desktop' Direct Manipulation Environments." *ACI CHI2000 Video Proceedings*, 2000. 2pp.

Rekimoto, Jun. "Pick-and-Drop: A Direct Manipulation Technique for Multiple Computer Environments." *Proceedings of UIST'97*, 1997. pp. 31-39.

Rekimoto, Jun. "SmartSkin: An Infrastructure for Freehand Manipulation on Interactive Surfaces." *CHI 2002*, Apr. 20-25, 2002, Minneapolis, Minnesota. © 2001 ACM 1-58113-453-3/02/0004. 8pp.

Rekimoto, Ullmer, and Oba. "DataTiles: A Modular Platform for Mixed Physical and Graphical Interactions." *SIGCHI'01*, Mar. 31-Apr. 4, 2001, Seattle, WA. © 2001 ACM 1-58113-327-8/01/0003. 8pp.

Reznik, Canny, and Alldrin. "Leaving on a Planet Jet." *2001 Int. Conf. on Intell. Robots & Systems (IROS)*, Maui, Hawaii, Oct. 2001. 6pp.

Ringel, Gerh, Jin, and Winograd. "Barehands: Implement-Free Interaction with a Wall-Mounted Display." Short Talks. *CHI 2001* Mar. 31-Apr. 5 pp. 367-368.

Rosenfeld, Zawadzki, Sudol, and Perlin. "Planar Manipulator Display." New York University mrl. NYU Media Research Lab. Available http://cat.nyu.edu/PMD. Printed May 16, 2004. 3pp.

Rovani, David (Posted by). "My Second Month with the Compaq Tablet." *Home>Reviews, TablePCHome.com—Table PC user community*. Posted Apr. 10, 2003. Available http://www.tabletpchome.com/Messages.aspx?ThreadID=140. Printed Dec. 30, 2003. pp. 1-2 of 5.

Schmalstieg, Encarnação, and Szalavári. "Using Transparent Props for Interaction With The Virtual Table." Presented at *1999 ACM Symposium on Interactive 3D Graphics (I3DG '99)*. Apr. 26-28, 1999, Atlanta, GA. 7pp.

Scott, Grant, and Mandryk. "System Guidelines for Co-located collaborative Work on a Tabletop Display." *Proceedings of ECSCW'03, European Conference Computer-Supported Cooperative Work 2003*, Helsinki, Finland, Sep. 14-18, 2003. 20pp.

Shen, Everitt, and Ryall. "UbiTable: Impromptu Face-to-Face Collaboration on Horizontal Interactive Surfaces." © Mitsubishi Electric Research Laboratories, Inc., 2003. Cambridge, Massachusetts. TR-2003-49. Sep. 2003. 10pp.

Shen, Lesh, and Vernier. "Personal Digital Historian: Story Sharing Around the Table." *Interactions*. Mar.+Apr. 2003. pp. 15-22.

Shen, Lesh, Bernier, Forlines, and Frost. "Sharing and Building Digital Group Histories." *CSCW'02*, Nov. 16-20, 2002, New Orleans, Louisiana. © 2002 ACM 1-58113-560-2/02/0011. 10pp.

Shen, Lesh, Moghaddam, Beardsley, and Bardsley. "Personal Digital Historian: User Interface Design." © Mitsubishi Electric Research Laboratories, Inc. 2001. Cambridge, Massachusetts. 5pp.

Shen, Vernier, Forline, and Ringel. "DiamondSpin: An Extensible Toolkit for Around-the-Table Interaction." *CHI 2004*, Apr. 24-29, 2004, Vienna, Austria. © 2004 ACM 1-58113-702-8/04/0004. 8pp.

Smart Technologies Inc. White Paper. "DViT Digital Vision Touch Technology." Feb. 2003. 10pp.

Smart Technologies Inc. "Rear Projection Smart Board ™ Interactive Whiteboard" "Smart Board Software". Available http://www.smart-tech.com/Products/rearprojection/index.asp and http://www.smart-tech.com/Products/sbsoftware/index.asp. Printed Dec. 16, 2003. 5pp. total.

Starner, Leibe, Singletary, Lyons, Gandy, and Pair. "Towards Augmented Reality Gaming." Available http://www.gvu.gatech.edu/ccg/publications/imagina2002/. Printed Dec. 30, 2003. 27pp.

Streitz, Geißler, Holmer, Konomi, Mller-Tomfelde, Reischl, Rexrogh, Seitz, and Steinmetz. "i-LAND: An interactive Landscape for Creativity and Innovation." *Proceedings of the ACM Conference on Human Factors in Computing Systems (CHI'99)*, Pittsburgh, Pennsylvania, May 15-20, 1999. ACM Press, New York. pp. 120-127.

Symanzik, Jürgen. "Three-Dimensional Statistical Graphics Based On Interactively Animated Anaglyphs." Published 1993. Available http://citeseer.mj.nec.com/95667.html. Printed Feb. 25, 2004. 7pp. total.

"The Tablet PC A detailed look at Microsoft's proposed Tablet PC." *Pen Computing Magazine: Tablet PC*. Available http://www.pencomputing.com/frames/textblock_tablet_pc.html. Printed Dec. 30, 2003. pp. 1.

Tandler, Prante, Mller-Tomfelde, Streitz, and Steinmetz. "ConnecTables: Dynamic Coupling of Displays for the Flexible Creation of Shared Workspaces." *Proceedings of the 14. Annual ACM Symposium on User Interface Software and Technoic (USIT'01)*, ACM Press (CHI Letters 3 (2)), 2001, pp. 11-20 (10pp).

Ullmer and Ishii. "The metalDESK: Models and Prototypes for Tangible User Interfaces." *Proceedings of UIST'97*, Oct. 14-17, 1997. © 1997 ACM—ACM 0-89791-881-9/97/10. 10pp.

Ullmer, Ishii, and Glas. "mediaBlocks: Physical Containers, Transports, and Controls for Online Media." *Computer Graphics Proceedings (SIGGRAPH'98)*, Jul. 19-24, 1998, © 1998 ACM. ACM-0-89791-999-8-8/98/007. 8pp.

Ullmer, Ishii, and Jacob. "Tangible query Interfaces: Physically Constrained Tokens for Manipulating Database Queries." *Proc. Interact 2003 Conference*, 2003. 11pp.

Underkoffler and Ishii. "Illuminating Light: An Optical Design Tool with a Luminous-Tangible Interface." *Proceeding of CHI '98*, Apr. 18-23, 1998, © 1998 ACM. pp. 1-8.

Underkoffler and Ishii. "Urp: A Luminous-Tangible Workbench for Urban Planning and Design." *Proceedings of CHI '99*. May 15-20, 1999. © 1998 ACM. pp. 1-8.

Underkoffler, Ullmer, and Ishii. "Emancipated Pixels: Real-World Graphics in the Luminous Room." *Proceedings of SIGGRAPH '99*, Aug. 8-13, 1999, © 1999 ACM. 8pp.

Vernier, Lesh, and Shen. "Visualization Techniques for Circular Tabletop Interfaces." To appear in *Advanced Visual Interfaces*, May 2002, Trento, Italy. © 2002 Mitsubishi Electric Research Laboratories, Inc. MERL-TR2002-01. Authored Mar. 2002. 10pp.

Viola and Jones. "Robust Real-time Object Detection." Cambridge Research Laboratory, Technical Report Series. Compaq. CRL 2001/01, Feb. 2001. 30pp.

"VirtualBoard." Available http://visilab.unime.it/visilab/virtualboard.htm. Printed Dec. 16, 2003. 6pp.

Von Hardenberg and Bérard. Bare-Hand Human-Computer Interaction. *PUI 2001* Orlando, FL, ©2001 ACM 1-58113-448-7-11/14/01. 8pp.

Wellner, Pierre. "Interacting with Paper on the DigitalDesk." *Communications of the ACM*. Jul. 1993. EuroPARC tech report EPC-93-195. 17pp.

Whalen, Tara. "Playing well with Others: Applying Board Game Design to Tabletop Display Interfaces." *UIST 2003*. Vancouver, Nov. 2-5, 2003, 3pp.

Wu and Balakrishnan. "Multi-Finger and Whole Hand Gestural Interaction Techniques for Multi-User Tabletop Displays." *UIST '03*, Vancouver, B.C., Canada. © 2003 ACM 1-58113-636-6/03/0010. pp. 193-202.

* cited by examiner

INVOKING APPLICATIONS WITH VIRTUAL OBJECTS ON AN INTERACTIVE DISPLAY

FIELD OF THE INVENTION

The present invention generally pertains to responding to a physical object that is placed on a display surface by launching a software application; and more specifically, pertains to detecting one or more physical objects placed on the display surface and in response, taking all necessary steps required to execute the software application on an interactive display system that includes the display surface.

BACKGROUND OF THE INVENTION

A user usually launches a software application by manipulating a mouse, joystick, wheel, game pad, track ball, or other user input device to select the application from a list of files or a group of graphic icons that represent applications installed on a personal computer (PC). Alternatively, the user may enter the path and executable file name for the application in a run dialog box to execute an application.

Another form of user input for executing an application employs touch-sensitive displays that are responsive to the touch of a user's finger or a stylus on the display screen. Touch responsive displays can be pressure activated, responsive to electrical capacitance, changes in magnetic field intensity, or responsive to other variables to determine the location of a finger or stylus contacting the display screen. Another type of touch sensitive display includes a plurality of optical sensors spaced-apart around a periphery of the display screen so that the location of a finger or stylus touching the screen can be detected. Using one of these touch sensitive displays, a user can touch a graphic icon or file name of an application to select it and then tap once (or twice) on the icon or file name to execute it on the PC. However, touch sensitive systems are generally incapable of detecting more than a single point of contact and are typically unable to detect the shape of an object that is proximate to or touching a display screen.

Another approach previously developed in the prior art that might be employed for launching an application uses cameras mounted to the side and above a horizontal display screen to visually capture an image of a user's finger or other object that is touching the display screen. This multiple camera mounting configuration is clearly not a compact system that most people would want to use in a residential setting. In addition, the accuracy of this imaging system in responding to an object that is on or proximate to the display surface depends upon the rather limited capability of the software used with the imaging system to visually recognize objects and their location in three-dimensional (3D) space.

To address many of the problems inherent in other types of touch-sensitive displays and imaging sensing systems, particularly in regard to launching a specific application, a user interface platform was developed in the MIT Media Lab, as reported by Brygg Ullmer and Hiroshi Ishii in "The meta-DESK: Models and Prototypes for Tangible User Interfaces," *Proceedings of UIST* 10/1997:14-17. This article describes how the metaDESK includes a near-horizontal graphical surface that is used to display two-dimensional (2D) geographical information. Above the graphical surface is disposed an arm-mounted flat-panel display that serves as an "active lens" for use in displaying 3D geographical information. A computer vision system inside the desk unit (i.e., below the graphical surface) includes infrared (IR) lamps, an IR camera, a video camera, a video projector, and mirrors. The mirrors reflect the graphical image projected by the projector onto the underside of the graphical display surface. The IR camera can detect a distinctive pattern provided on the undersurface of passive objects called "phicons" that are placed on the graphical surface. Magnetic-field position sensors and electrical-contact sensors are also included in the metaDESK. The reference describes, for example, how the IR camera detects the IR pattern (which is transparent to visible light) applied to the bottom of a "Great Dome phicon" and responds by displaying a map of the MIT campus on the graphical surface, with the actual location of the Great Dome in the map positioned where the Great Dome phicon is located. Moving the Great Dome phicon over the graphical surface manipulates the displayed map by rotating or translating the map in correspondence to the movement of the phicon by a user.

A similar approach to sensing objects on a display surface is disclosed in several papers published by Jun Rekimoto of Sony Computer Science Laboratory, Inc., in collaboration with others. These papers briefly describe a "HoloWall" and a "HoloTable," both of which use IR light to detect objects that are proximate to or in contact with a display panel on which a rear-projected image is visible. The rear-projection panel, which is vertical in the HoloWall and horizontal in the HoloTable, is semi-opaque and diffusive, so that objects reflecting IR light back through the panel become more clearly visible to an IR camera as they approach and then contact the panel. The objects thus detected can be a user's fingers or hand, or other objects. In a paper entitled, "CyberCode: Designing Augmented Reality Environments with Visual Tags, Designing Augmented Reality Environments," *DARE* (2000), Jun Rekimoto et al. disclose that the IR camera can recognize IR identification (ID) tags attached to objects that are placed on such a device. The reference teaches that "when a device with a camera recognizes these IDs, a predefined action—such as opening a specific web page—launching an application, or starting a movie, is activated automatically."

While using an ID tag on an object to launch a related application is thus known in the art, there does not seem to be any teaching about responding to a plurality of objects of about simply recognizing objects per se, such as by their shape of other characteristics. For example, it would be desirable to enable an optical sensing system to detect a specific object based on its shape, size, or other physical characteristics and respond by launching a related application. Thus, if a user places a camera on a display surface that includes an optical sensing system, it would be desirable to automatically detect the camera based upon its physical characteristic(s), and automatically launch an application to download images from the camera and to organize the images for storage, or to edit them.

The prior art does not suggest how to deal with the situation that can occur when the application that should be launched in response to detecting an object is not installed on a local storage accessed by the interactive display that detects the object. It would be desirable to automatically respond by downloading the application program from a remote server or other remote storage site, if the application is not installed locally. Once downloaded, the application should be installed, registered to the current user of the interactive display (if appropriate), and then executed.

Also, in some cases, a plurality of applications might be associated with one object, so that it would not be clear which software application to automatically launch when the object is detected on the display surface. Accordingly, it would be desirable to detect a plurality of objects that constitute a plurality of objects uniquely associated with a specific application, and then launch that specific application in response to detecting the plurality of objects or proximate to the display screen.

SUMMARY OF THE INVENTION

The present invention makes use of an interactive display system that serves both for display of text and graphics and for input in an intuitive manner. In connection with this invention, the interactive display system's ability to sense objects placed on a display surface of the interactive display system facilitates an automatic response to objects that have been associated with software applications, when the objects are placed on the display surface and are detected by the interactive display system.

Accordingly, one aspect of the present invention is directed to a method for executing a software application in response to at least one object being placed on a display surface. The method includes the step of detecting at least one characteristic of one or more objects placed on the display surface in order to identify each object as a function of the characteristic(s) detected. The method then determines if one object identified is uniquely associated with executing only one software application, and if so, executes the software application if it is already installed for use by a current user of the display surface. If the one object that is identified is associated with more than one software application, the method provides for determining if a plurality of objects that have been placed on the display surface and have been identified are uniquely associated with executing only one software application. If so, the method provides for executing the one software application if it is installed for use by the current user of the display surface.

An example will help to explain the significance of these steps. If dice are used for playing several different software games, a die might be a logical object to associate with each such software game. However, it will not be apparent which of the software games should be executed if a die is detected on the display surface. But, if one of the games also uses player pieces to indicate each player's position on a game board that is displayed, while each of the other games also uses some other objects during the game play, each such game software can be uniquely associated with a combination of two (or more) objects, so that when the two (or more) objects are detected on the display surface, the appropriate software game will be executed, if it is already installed on the system.

If the software application has not been installed for use by the current user, the method further provides for connecting over a network to a predefined remote storage, where the software application is stored. The software application is downloaded over the network, from the predefined remote storage and is then installed and executed. The step of installing optionally also includes the step of registering the software application. In addition, if the software application can only be downloaded after a charge is paid, the method may include the step of enabling a current user of the display surface to enter information relating to either a debit or a credit account, or some other payment form arranged established by the user for making online purchases. This information will preferably be stored locally and can be transferred to the online site to complete the purchase as authorized by the user. Alternatively, the current user can purchase the software application prior to downloading it, by automatically transmitting the information relating to the user's account to an entity associated with the remote storage.

The step of detecting is preferably carried out by illuminating the one or more objects placed on the display surface with light that passes through the display surface and is incident on the object(s). Light reflected from object(s) placed on the display surface is received and causes a corresponding signal to be produced. This signal is then processed to determine the one or more characteristics for each object placed on the surface, to identify the object(s).

The one or more characteristic(s) can include one or more of a shape of the object, a size of the object, a location where the object is placed on the display surface, and a pattern disposed on the object.

As noted above, in certain cases, the object(s) placed on the surface are used within the software application after the software application is executed, e.g., as dice, player pieces, a spinner, etc. In other cases, the object is easily perceived as being related to the software application. For example, a camera (or a plastic model of one) might be placed on the display surface to cause a photo editing software application to be executed. Alternatively, the object may be closely related to a function of the software application. Thus, a remote control may be placed on the display surface to cause a television program guide software application to be executed.

If the software application was purchased in a package, placing the package on the display surface can cause that software application to be executed.

Another aspect of the present invention is directed to a memory medium on which machine executable instructions are stored for carrying out functions generally consistent with the steps of the method discussed above.

Yet another aspect of the invention relates to a system for executing a software application in response to at least one object being identified. The system includes an interactive display system having a projector, an object detector, and a display surface on which images produced by the software application are displayed by the projector when the software application is executed. A memory stores machine instructions, and a processor is coupled to the interactive display system and to the memory to execute the machine instructions, causing the processor to carry out a plurality of functions that are generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary System for Implementing Present Invention

Figure 1:
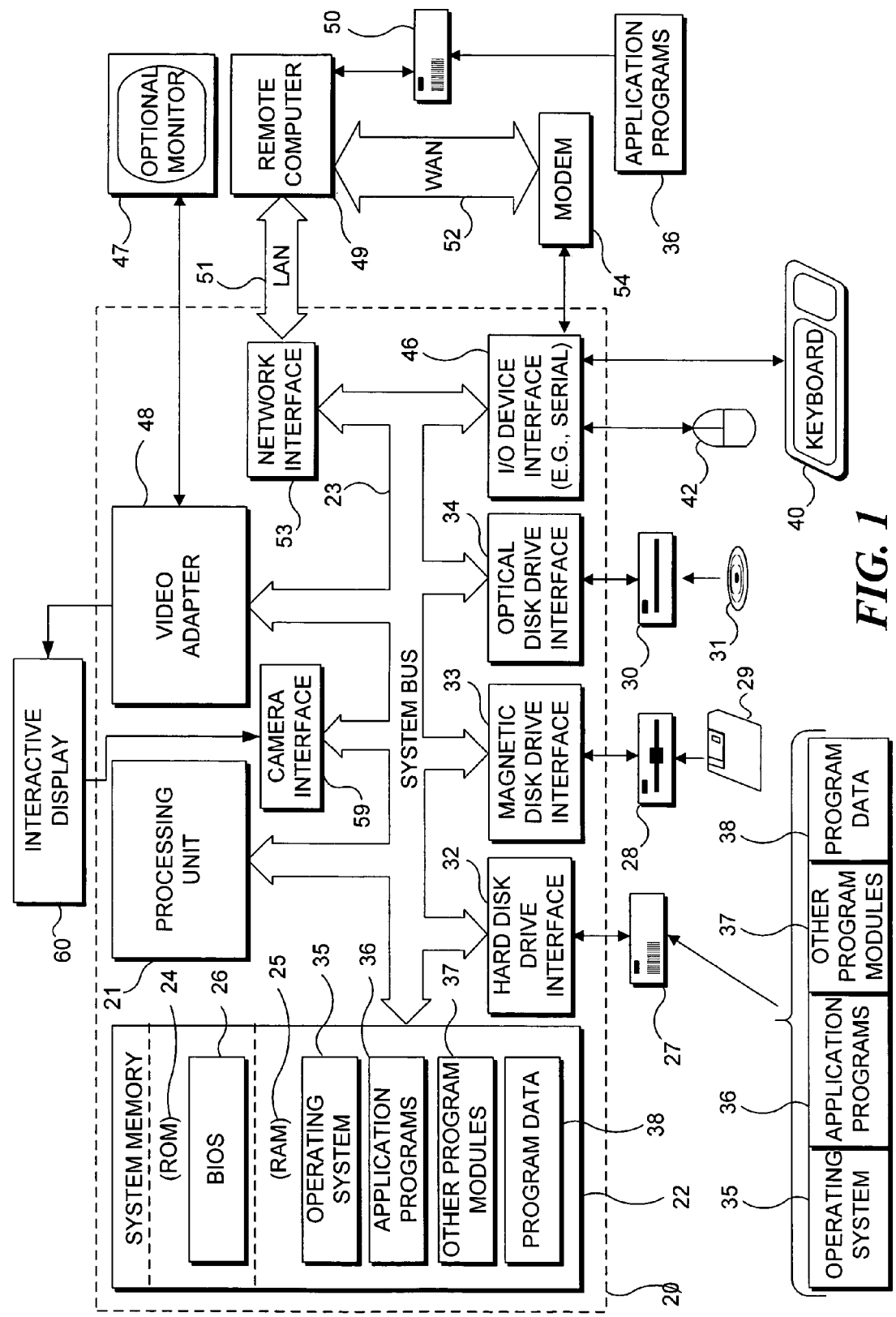
FIG. 1 is a functional block diagram of a generally conventional computing device or PC that is suitable for processing the input and output data used in practicing the present invention, and is alternatively also exemplary of a computing device that may be included within an interactive display system in accord with the present invention.

With reference to FIG. 1, an exemplary system suitable for implementing various portions of the present invention. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. The PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information in to PC 20, and provide control input through input devices such as a keyboard 40 and a pointing device 42. Pointing device 42 may include a mouse, stylus, wireless remote control, or other pointer, but in connection with the present invention, such conventional pointing devices may be omitted, since the user can employ the interactive display for input and control. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). System bus 23 is also connected to a camera interface 59, which is coupled to an interactive display 60 to receive signals form a digital video camera that is included therein, as discussed below. The digital video camera may be instead coupled to an appropriate serial I/O port, such as to a USB version 2.0 port. Optionally, a monitor 47 can be connected to system bus 23 via an appropriate interface, such as a video adapter 48; however, the interactive display of the present invention can provide a much richer display and interaction with the user for display and input of information and control of software applications and is therefore coupled to the video adaptor. In addition to the monitor, PCs are often coupled to other peripheral output devices (not shown), such as speakers (through a sound card or other audio interface—not shown) and printers.

The present invention may be practiced on a single machine, however, PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

Exemplary Interactive Display Table

Figure 2A:
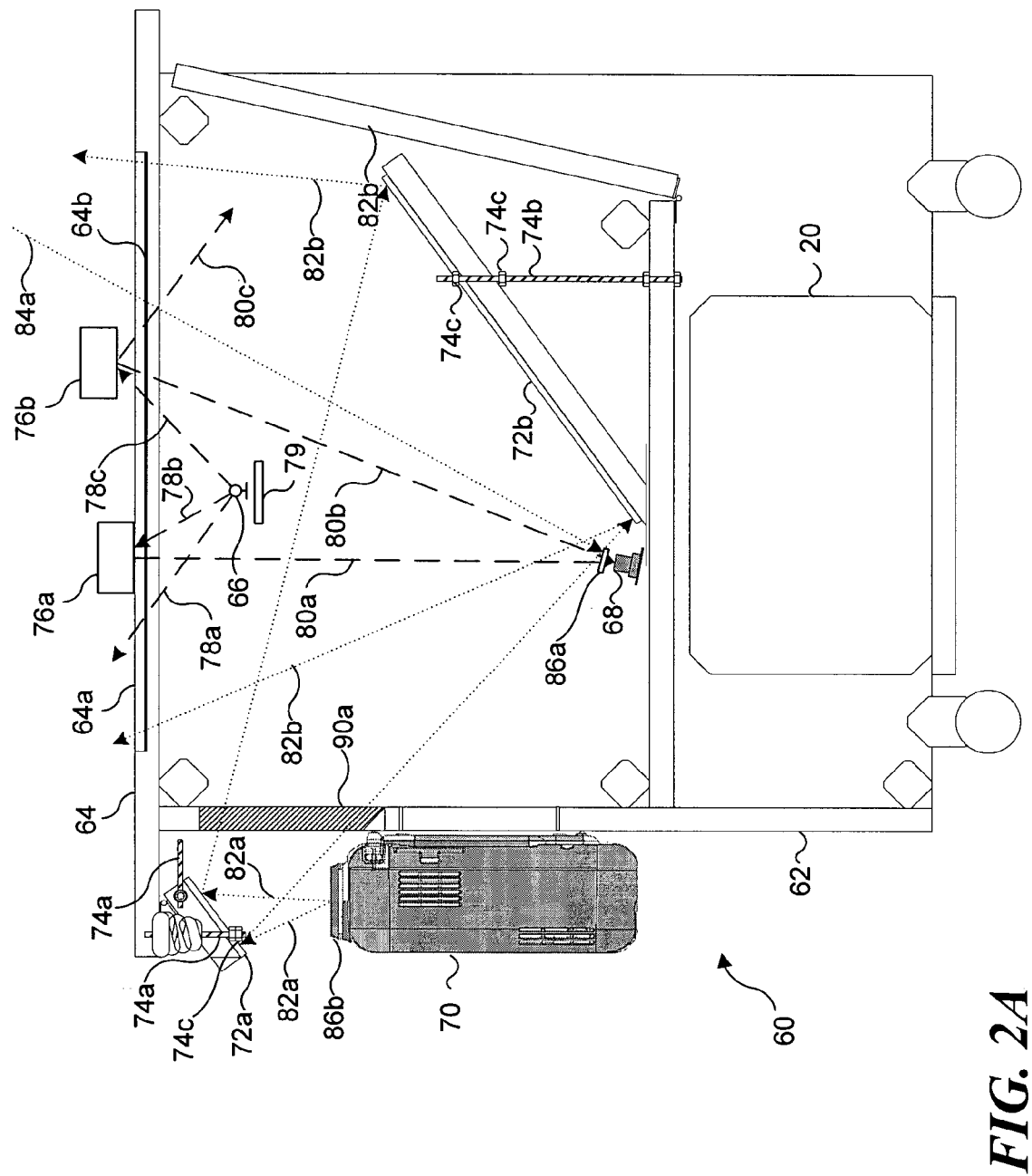
FIG. 2A is an illustration of the interior of the interactive display table showing hardware components included, the paths followed by light within the interactive display table, and exemplary objects disposed on and above the surface of the interactive display table.

In FIG. 2A, an exemplary interactive display table 60 is shown that includes PC 20 within a frame 62 and which serves as both an optical input and video display device for the computer. In this cut-away Figure of the interactive display table, rays of light used for displaying text and graphic images are generally illustrated using dotted lines 82a and 82b, while rays of infrared (IR) light used for sensing objects on or just above a display surface 64a of the interactive table are illustrated using dash lines 80a and 80b. Display surface 64a is set within an upper surface 64 of the interactive display table. The perimeter of the table surface is useful for supporting a user's arms or other objects, including objects that may be used to interact with the graphic images or virtual environment being displayed on display surface 64a.

IR light sources 66 preferably comprise a plurality of IR light emitting diodes (LEDs) and are mounted on the interior side of frame 62. The IR light that is produced by IR light sources 66 is directed upwardly toward the underside of display surface 64a, as indicated by dash lines 78a, 78b, and 78c. The IR light from IR light sources 66 is reflected from any objects that are atop or proximate to the display surface after passing through a translucent layer 64b of the table, comprising a sheet of vellum or other suitable translucent material with light diffusing properties. Although only one IR source 66 is shown, it will be appreciated that a plurality of such IR sources may be mounted at spaced-apart locations around the interior sides of frame 62 to prove an even illumination of display surface 64a. The infrared light produced by the IR sources may:

exit through the table surface without illuminating any objects, as indicated by dash line 78a;

illuminate objects on the table surface, as indicated by dash line 78b; or illuminate objects a short distance above the table surface but not touching the table surface, as indicated by dash line 78c.

Objects above display surface 64a include a "touch" object 76a that rests atop the display surface and a "hover" object 76b that is close to but not in actual contact with the display surface. As a result of using translucent layer 64b under the display surface to diffuse the IR light passing through the display surface, as an object approaches the top of display surface 64a, the amount of IR light that is reflected by the object increases to a maximum level that is achieved when the object is actually in contact with the display surface.

A digital video camera 68 is mounted to frame 62 below display surface 64a in a position appropriate to receive IR light that is reflected from any touch object or hover object disposed above display surface 64a. Digital video camera 68 is equipped with an IR pass filter 86a that transmits only IR light and blocks ambient visible light traveling through display surface 64a along dotted line 84a. A baffle 79 is disposed between IR source 66 and the digital video camera to prevent IR light that is directly emitted from the IR source from entering the digital video camera, since it is preferable that this digital video camera should produce an output signal that is only responsive to the IR light reflected from objects that are a short distance above or in contact with display surface 64a. It will be apparent that digital video camera 68 will also respond to any IR light included in the ambient light that passes through display surface 64a from above and into the interior of the interactive display (e.g., ambient IR light that also travels along the path indicated by dotted line 84a).

IR light reflected from objects on or above the table surface may be:

reflected back through translucent layer 64b, through IR pass filter 86a and into the lens of digital video camera 68, as indicated by dash lines 80a and 80b; or be reflected or absorbed by other interior surfaces within the interactive display without entering the lens of digital video camera 68, as indicated by dash line 80c.

Translucent layer 64b diffuses both incident and reflected IR light. Thus, as explained above, "hover" objects that are closer to display surface 64a will reflect more IR light back to digital video camera 68 than objects of the same reflectivity that are farther away from the display surface. Digital video camera 68 senses the IR light reflected from "touch" and "hover" objects within its imaging field and produces a digital signal corresponding to images of the reflected IR light that is input to PC 20 for processing to determine a location of each such object, and optionally, the size, orientation, and shape of the object. It should be noted that a portion of an object (such as a user's forearm) may be above the table while another portion (such as the user's finger) is in contact with the display surface. In addition, an object may include an IR light reflective pattern or coded identifier (e.g., a bar code) on its bottom surface that is specific to that object or to a class of related objects of which that object is a member. Accordingly, the imaging signal from digital video camera 68 can also be used for detecting each such specific object, as well as determining its orientation, based on the IR light reflected from its reflective pattern.

Figure 2B:
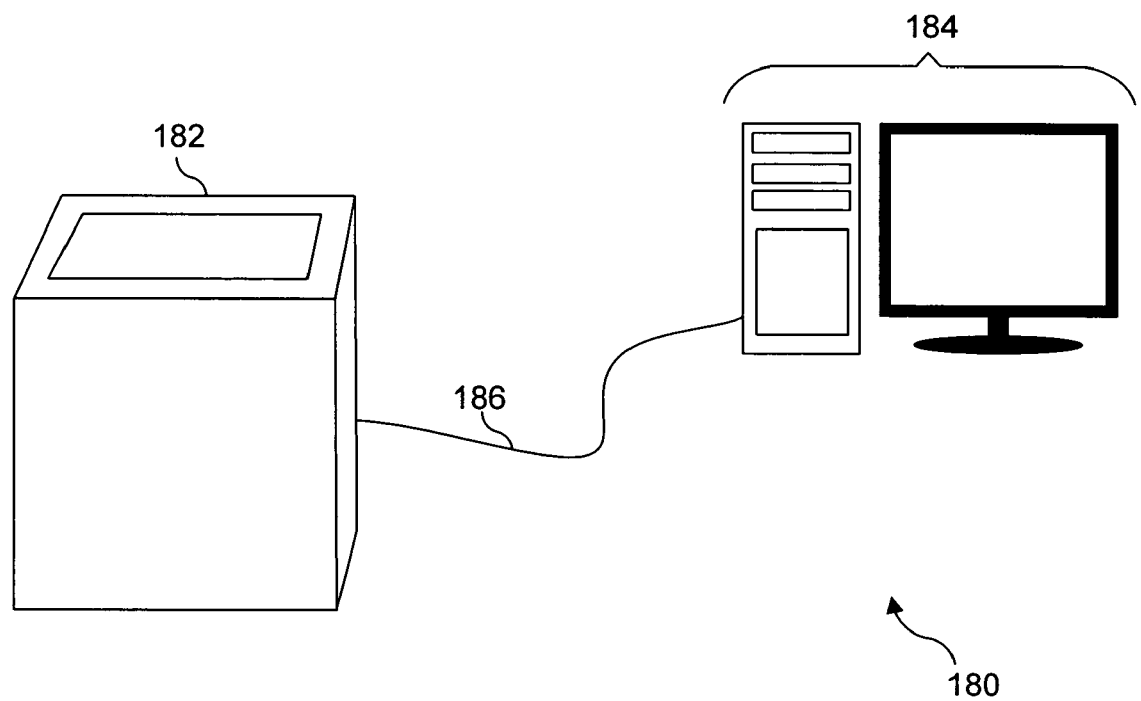
FIG. 2B is a block diagram illustrating how the present invention can be implemented as an interactive display that is coupled to a stand alone personal computer or other computing device.

PC 20 may be integral to interactive display table 60 as shown in FIG. 2A, or alternatively, may instead be external to the interactive display table, as shown in the embodiment of FIG. 2B. In FIG. 2B, an interactive display table 182 is connected through a data cable 186 to an external PC 184 (which includes the optional monitor, as mentioned above). If the interactive display table is connected to an external PC 184 or to some other type of computing device, such as a set top box, video game, laptop computer, or media computer, then the interactive display table comprises an input/output device. Data cable 186, which connects to interactive display table 182, can be coupled to a USB 2.0 port, an Institute of Electrical and Electronics Engineers (IEEE) 1394 (or Firewire) port, or an Ethernet port on PC 184. It is also contemplated that as the speed of wireless connections continues to improve, the interactive display table might also be connected to a computing device such as PC 184 via such a high speed wireless connection, or via some other appropriate wired or wireless data communication link. Whether included internally as an integral part of the interactive display, or externally, PC 20 executes algorithms for processing the digital images from digital video camera 68 and executes software applications that are designed to use the more intuitive user interface functionality of interactive display table 60 to good advantage, as well as executing other software applications that are not specifically designed to make use of such functionality, but can still make good use of the input and output capability of the interactive display table. As yet a further alternative, the interactive display can be coupled to an external computing device, but include an internal computing device for doing image processing and other tasks that would then not be done by the external PC.

An important and powerful feature of the interactive display table (i.e., of either embodiments discussed above) is its ability to display graphic images or a virtual environment for games or other software applications and to enable an interaction between the graphic image or virtual environment visible on display surface 64a and objects that are resting atop the display surface or are hovering just above it.

Again referring to FIG. 2A, interactive display table 60 includes a video projector 70 that is used to display graphic images, a virtual environment, or text information on display surface 64a. The video projector is preferably of a liquid crystal display (LCD), liquid crystal on silicon (LCoSS) type, or digital light processor (DLP) type, with a resolution of at least 640×480 pixels. An IR cut filter 86b is mounted in front of the projector lens of video projector 70 to prevent IR light emitted by the video projector from entering the interior of the interactive display table where the IR light might interfere with the IR light reflected from object(s) on or above display surface 64a. A first mirror assembly 72a directs projected light traveling from the projector lens along dotted path 82a through a transparent opening 90a in frame 62, so that the projected light is incident on a second mirror assembly 72b. Second mirror assembly 72b reflects the projected light onto translucent layer 64b, which is at the focal point of the projector lens, so that the projected image is visible and in focus on display surface 64a for viewing.

Alignment devices 74a and 74b are provided and include threaded rods and rotatable adjustment nuts 74c for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64b to enable a longer focal length (and lower cost) projector lens to be used with the projector.

Logic Employed to Execute Software Application in Response to Object(s)

Figure 3:
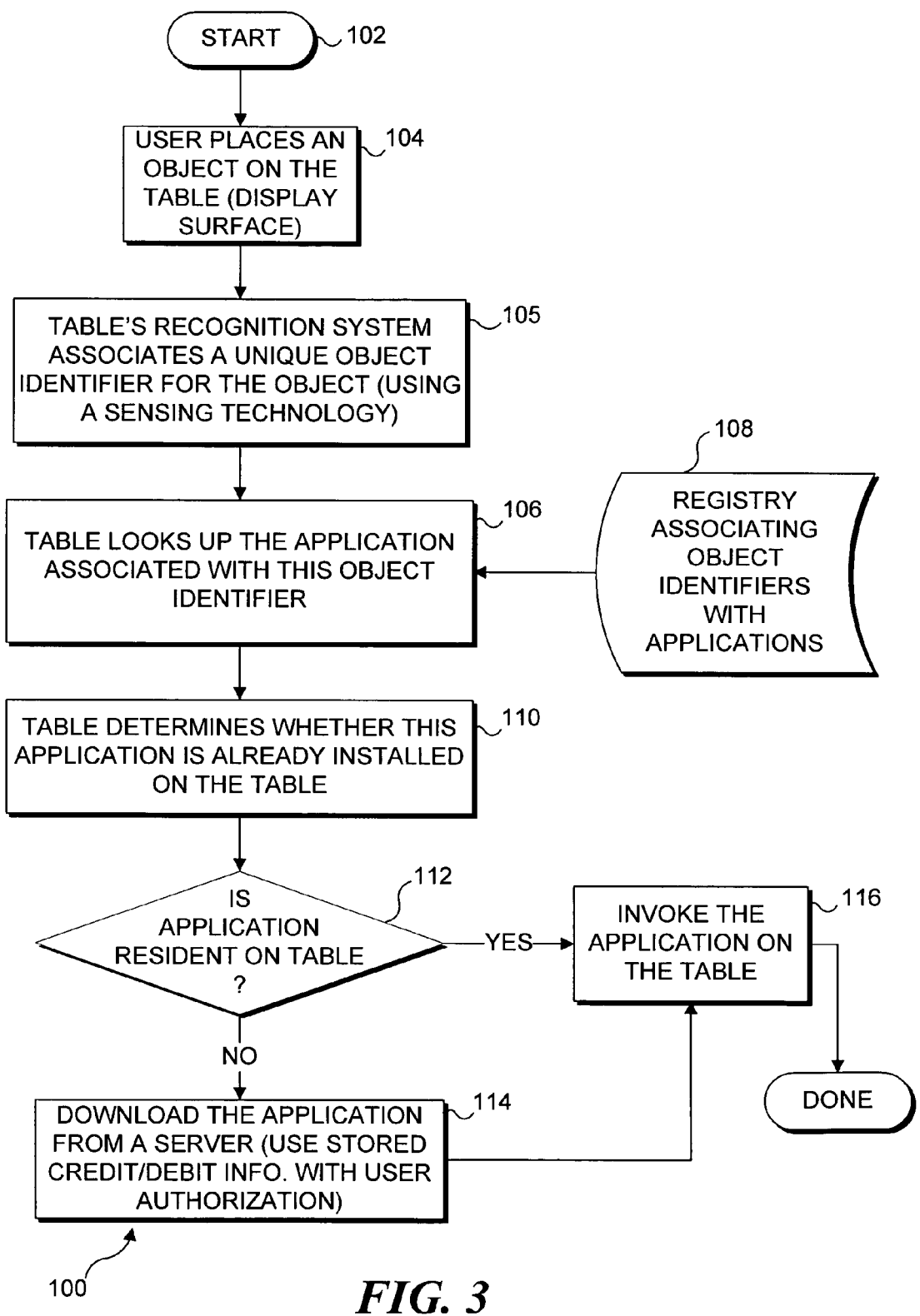
FIG. 3 is a flowchart illustrating the logical steps employed to launch a software application in response to a specific object associated with the software application being detected on the display surface of the interactive display table of FIG. 2A.
Figure 4:
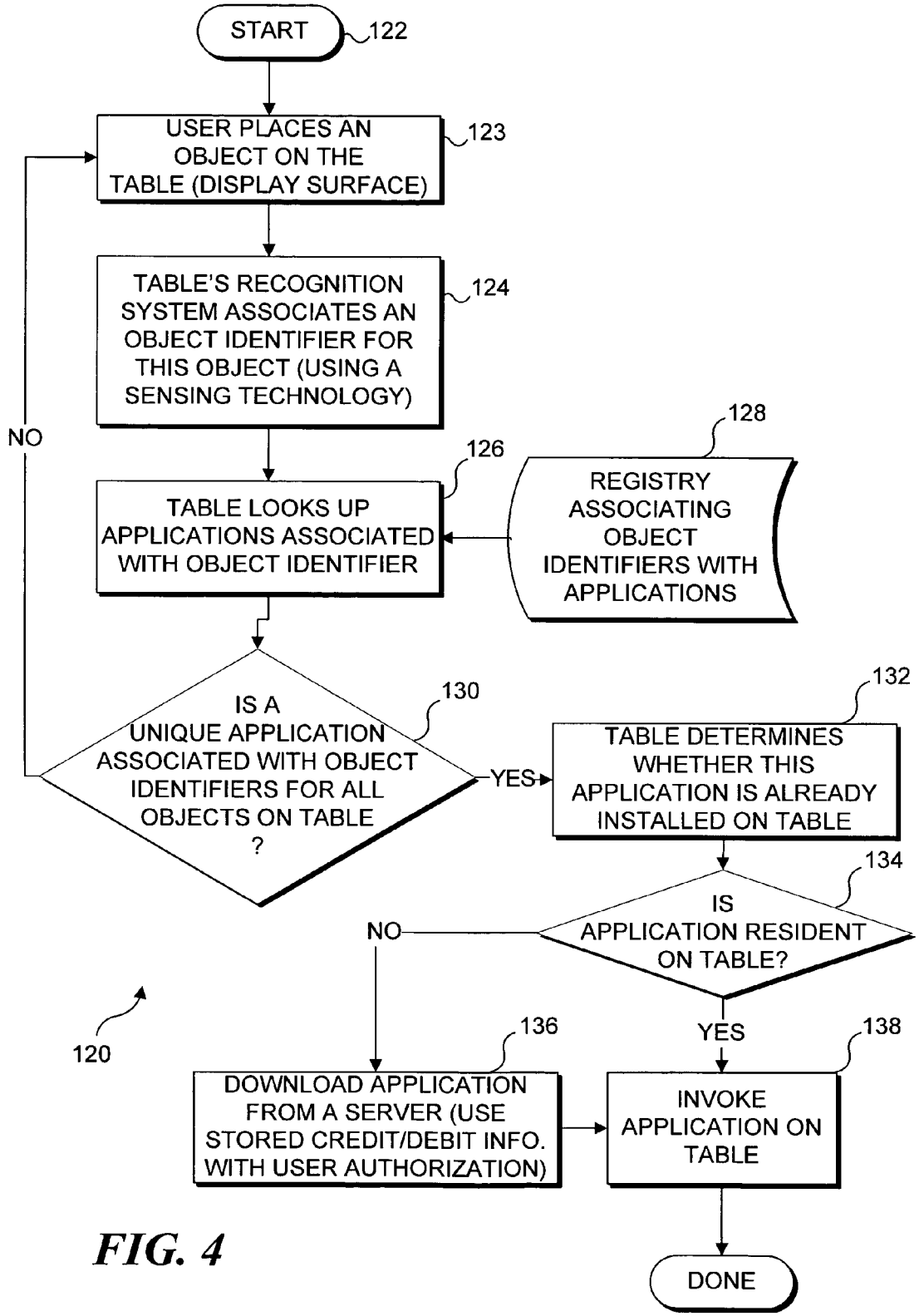
FIG. 4 is a flowchart illustrating the logical steps employed for launching a software application when a plurality of objects uniquely associated with the software application are placed on the display surface.

The logical steps implemented in detecting one or more objects and launching an associated application program are illustrated in FIGS. 3 and 4. FIG. 3 includes a flow chart 100 showing the steps that are carried out when a single object is uniquely associated with a software application. Beginning at a start block 102 the logic proceeds to a step 104 where the user places an object on display surface 64a (see FIG. 2A) of the interactive display table. Next, in a step 105 using an appropriate sensor included in the interactive display table, the object recognition system of the interactive display table recognizes an object identifier associated with the object that has been placed on the display surface. In a preferred embodiment of the present invention, the sensing technology includes the IR source that emits IR light, which passes through the display surface and is reflected back from the object that is placed on or proximate the display surface. The IR light reflected back through the display surface is received by the IR camera, producing a corresponding image of the object identifier. Since display surface 64a diffuses light, only objects that are relatively close to the display surface will reflect light that produces a discernible image that can be used by the IR camera to identify the object. If the object is too far from the display surface, its image will not be clearly discernible by the IR sensing technology (i.e., the IR camera) used in this embodiment. Although, in most cases, it is likely that the object will be detected when actually placed in contact with the display surface, the phrase referring to an object as "being placed on the display surface" as used herein and in the claims that follow, should be broadly construed to include an object being placed sufficiently close to the display surface, so that the object is discernible by the object sensing system.

Various techniques can be used to identify an object identifier associated with a specific object. For example, the object identifier can be an encoded pattern disposed on the bottom of the object (as discussed below in connection with FIG. 9), or can relate to the shape of the object, its size, or the location on the display surface of which the object is placed, or a combination of these and other parameters.

Next, the logical process of FIG. 3 continues with a step 106, which provides that the table (i.e., PC 20 or other computing device to which the interactive display is coupled) looks up the application that is associated with the object identifier recognized in step 105. Step 106 is implemented by accessing a registry 108 that includes entries indicating the object identifiers associated with different software applications.

In a step 110, the table determines whether the application that is associated with the specific object identifier looked up in step 106 is already installed on the table. If the software application has already been installed on the table, the machine instructions for executing the application will be stored on a hard drive or other non-volatile storage of PC 20 or of another computing device to which the interactive display table is connected. An optional decision step 112 then determines if the application is resident in this storage and takes appropriate action depending on the determination of this decision step. Specifically, if the application is not resident on the table but was determined to be associated with the object that was placed on the display surface, a step 114 downloads the software application from a remote server where it is stored. In many cases, it may be necessary for the user to first purchase the software application before it is downloaded. Accordingly, if the user has previously entered credit or debit card information for making purchases over the network, and the user has authorized the transaction, the software application can be automatically downloaded to complete the purchase transaction. During this step the appropriate credit or debit card information is transferred over the network to an entity associated with the storage from which the software application is being downloaded. This debit or credit card information will thus be used to complete the purchase transaction, thereby enabling the table (i.e., PC 20) to automatically download the software application to its own storage for installation.

A step 116 then invokes the application on the table. Step 116 is also implemented if the application is already resident on the table and is in a local storage that is accessible to it so that the software application does not need to be downloaded over the network from a remote storage. In step 116, unless the application has already been installed, part of the step of invoking it requires that it be installed so that the user is able to execute the application. Once installed, or if already installed, step 116 further causes the application to be executed. Typically, execution of an application will cause graphic images to be displayed on the display surface, since many such applications will be directed to enabling the user to interact with the software application using the display surface. Also, many software applications will benefit from both the user input and data display capabilities of the interactive display table. The logic is then completed.

Often, an object that is employed in the software application will be placed on the display surface to cause the interactive display table to load and execute the software application. However, an object that is used in one application may also sometimes be used in one or more other software applications. In that case, a plurality of objects (perhaps including the object that is used in multiple software applications) can be uniquely associated with a specific application. For example, dice might be used in several different software applications that can be executed on the interactive display table. Accordingly, a die can only be used to launch a specific application if another object that is also placed on the display surface and recognized by the sensing technology, because the object identifiers of the die and the other object in combination are uniquely associated with the specific software application.

FIG. 4 illustrates a flow chart 120 showing the logical steps employed in recognizing a plurality of objects that are uniquely associated with a software application in order to launch the application. Beginning with a start block 122, the logic proceeds to a step 123 wherein a user places an object on the display surface of the interactive display table. Again, in a step 124, the sensing technology, which in a preferred embodiment comprises the IR camera that senses IR light reflected back from an object in proximity with the display surface, is used to recognize an object identifier associated with the object. A step 126 then provides that the table (i.e., PC 20) looks up applications that are associated with the object identifier. In this case, it is presumed that the object may be associated with more than one different software application. The association between the object that was identified by the table is determined from a registry 128, which maintains the association between all object identifiers and different software applications. A decision step 130 then determines if a unique application is associated with the object identifier for the objects that have been identified as being placed in proximity to the display surface of the table. Clearly, if a single object has been placed on the display surface and its object identifier is recognized so that the object is found to be associated with more than one software application, the table will await one or more other objects to be placed on the table, which in combination with the object already identified, will be uniquely associated with a single software application. Accordingly, the logic loops back to step 122 if only a single object has been identified and is associated with more than one software application, or if the objects thus placed on the display surface are not yet found to be uniquely associated with a single software application.

Once a unique association is determined in regard to a single object or a plurality of objects that have been placed on the display surface, the logic proceeds to a step 132. In step 132, the table (i.e., PC 20) determines whether the application that is uniquely associated with the object(s) identified as being placed proximate the display surface is already installed and available in the storage accessible by the table. Thus, decision step 134 determines if the application is resident on the table (i.e., in the local storage for software applications) and if not, a step 136 downloads the application from a remote server where it is stored. As previously discussed in connection with FIG. 3, the stored credit or debit card information for the user, along with that user's authorization can be employed to automatically complete the purchase of the software application so that it can be downloaded from the remote storage. In a step 138, if the application is already resident on the table, or after it has been downloaded and installed, the software application is invoked as explained above. The user can interact with the software application that is executed using the interactive display table and can provide input through the display surface while viewing images and data projected on the display surface. The logic is then complete.

A further variation is also contemplated deals with the situation in which one or more objects placed on the display surface is not uniquely associated with a single application. In this case, a menu can be displayed in which the applications with which the one or more objects are associated is displayed, enabling a user to make a selection from among the options, to indicate the application that should be downloaded and/or invoked. As each additional object associated with one or more of the applications listed is added to the display surface, the list can shrink in size, to include only those application(s) that are associated with objects on the display surface. However, at anytime, the user can select an application from the choices displayed by this dynamically constructed menu to download and/or invoke.

Figure 5:
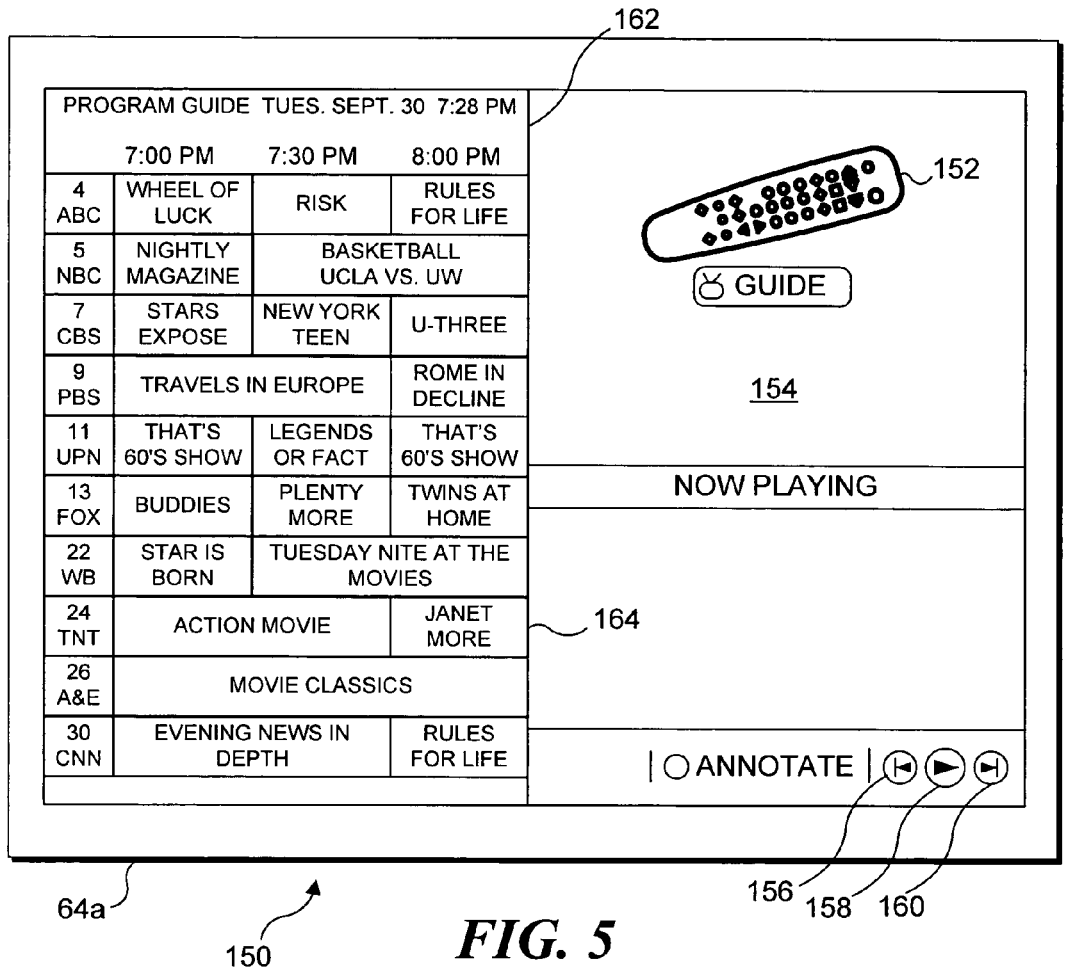
FIG. 5 illustrates the display surface (the rest of the interactive display table is not included to simplify the drawing), showing an exemplary television programming guide that is displayed by a corresponding software application in response to a remote control being placed on the display surface of the interactive display table.

In several of the examples discussed above, an object that is placed on the display surface to launch a software application is subsequently used in the software application. Alternatively, the object used to launch a software application may have a relationship to the function of the software application, but not be used while the application is executed. For example, FIG. 5 illustrates how a television program guide 150 is displayed by a software application that is executed when a remote control 152 is placed on display surface 64a of the interactive display table. To simplify this example and several examples discussed below, only display surface 64a of the interactive display table is shown in these FIGURES. Also included on the program guide are controls 156, 158, and 160, which can be used to move through different portions of the programming guide or for another purpose, such as controlling the application. A header section 162 of the program guide indicates the date, day, and current time as well as showing the hours for which different programs are currently illustrated in the program guide. These programs and the channels on which they are playing are shown in a section 164.

Remote control 152 is disposed in a region 154 on display surface 64a and is sensed by the IR light sensing system used in the interactive display table. Its object identifier can be determined based only upon the shape of the remote control, or by recognizing an object identifier provided as a pattern applied to the back surface of the remote control. Alternatively, the interactive display table may respond to any object within a predefined range of size and shape that is placed in region 154 on the display surface, when determining the object identifier of the remote control. This object identifier is associated with launching the software application that displays the television program guide shown in FIG. 5. Any combination of the size of an object, its shape, as well as the region in which the object is detected (and other parameters), can be uniquely associated with the software application that is executed. Other identifying characteristics of an object that can be detected for this purpose include a size, a color, an electrical characteristic, an radio frequency signature, or almost anything that can differentiate one object from another.

Figure 6:
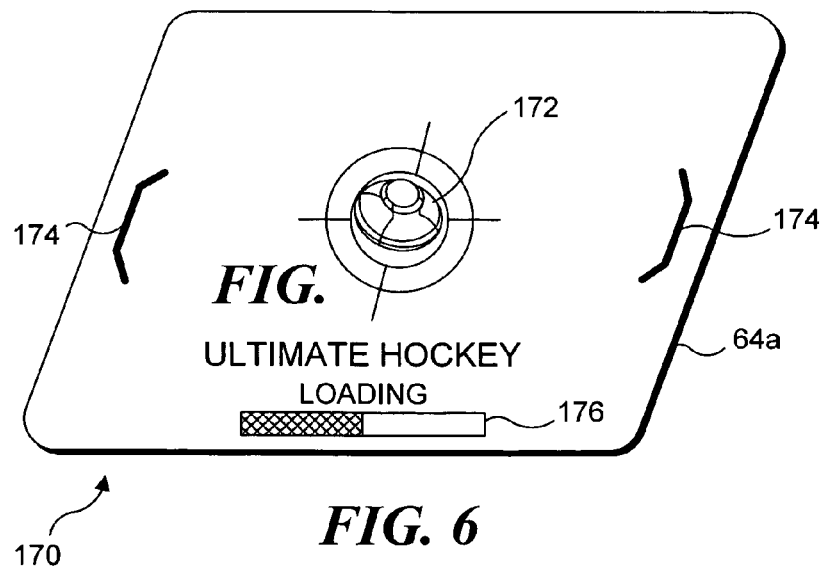
FIG. 6 is an oblique view of the display surface of the interactive display table (the rest of the interactive display table is not included to simplify the drawing), showing how a puck used in an electronic hockey game is detected when placed on the display surface, causing the electronic hockey game to be executed.
Figure 9:
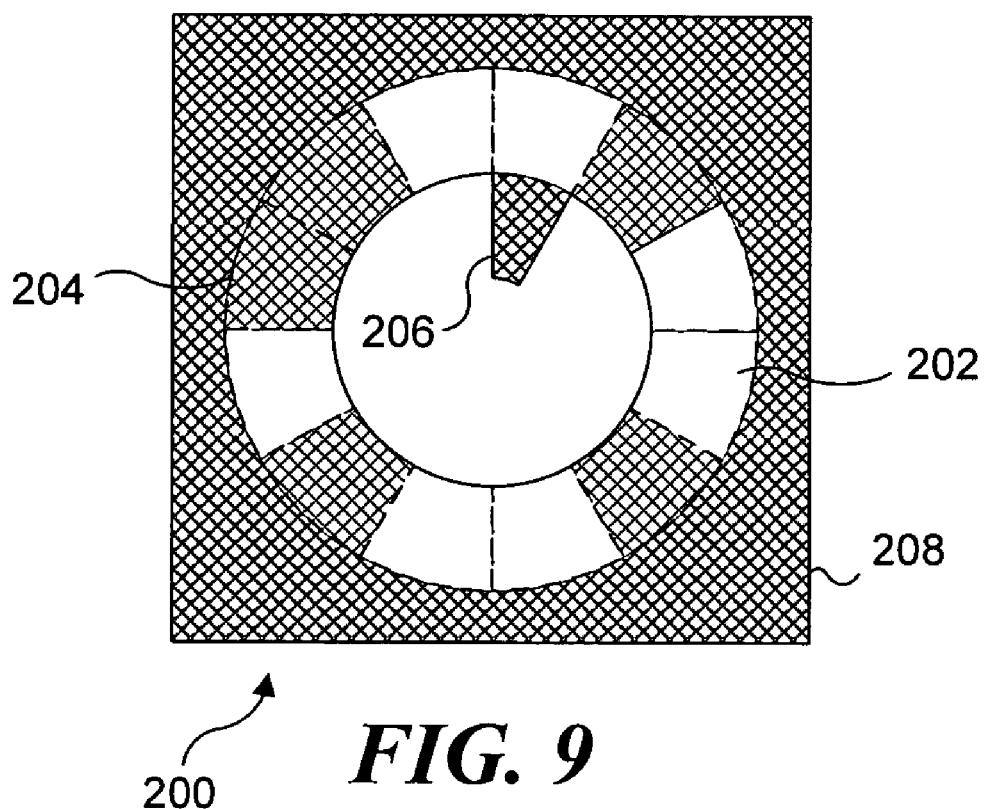
FIG. 9 is a bottom view of an object illustrating an exemplary identifier code that is detected when the object is placed on the display surface of the interactive display table.

FIG. 6 illustrates how an electronic game such as Ultimate Hockey game 170, which is shown in the Figure is executed when an object that is used in playing the electronic game is detected on the display surface. In this case, a hockey puck 172 is place on display surface 64a. An encoded pattern appearing on the bottom of the hockey puck (as shown in FIG. 9) is recognized as the object identifier, causing the table to load the Ultimate Hockey software application. Goals 174 are already graphically illustrated on display surface 64a, and additional graphical features of the game will be displayed as the game continues to load. A loading progress bar 176 indicates the relative portion of the software application that has been downloaded over a network from a storage at another site (if necessary).

Figure 7:
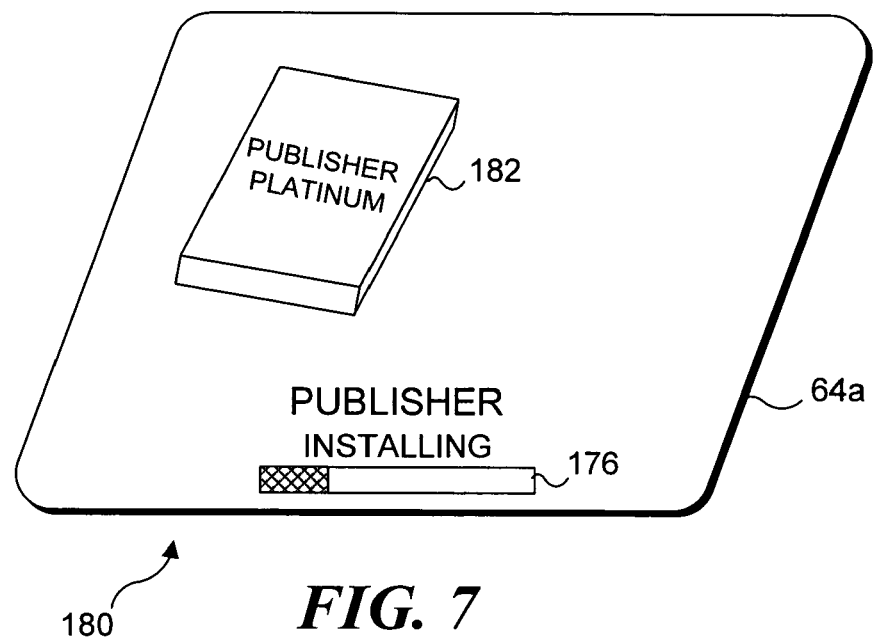
FIG. 7 is an oblique view of the display surface of the interactive display table (the rest of the interactive display table is not included to simplify the drawing), showing how a software package is detected when placed on the display surface, causing the software that was sold in the package to be installed and/or executed.

FIG. 7 illustrates yet another intuitive relationship between the software application and the object that is placed on to the display surface of the interactive display table to launch the software application associated with the object. As shown in this Figure, a Publisher software application 180 is being installed in response to the IR sensing system of the interactive display table recognizing an object identifier associated with a package 182 in which the Publisher software application was purchased. Package 182 may only have contained instruction books and other literature, but when placed upon display surface 64*a* of the interactive display table, the package can cause the Publisher software application to be downloaded, installed, and registered to the current user of the table. A barcode or other object identifier on the undersurface of package 182 is recognized by the sensing technology of the interactive display table using the reflected IR light from the package. Accordingly, no further purchase transaction is required, since possession of the software package indicates that the user has the right to install the Publisher software application sold in the package on the table. Once the Publisher software shown in this example has been installed on the interactive display table (or PC 20), simply placing the package for the software on the table can cause the Publisher software application to be executed, enabling the user to interact with the Publisher software application to create publications to be printed or for other purposes.

Figure 8:
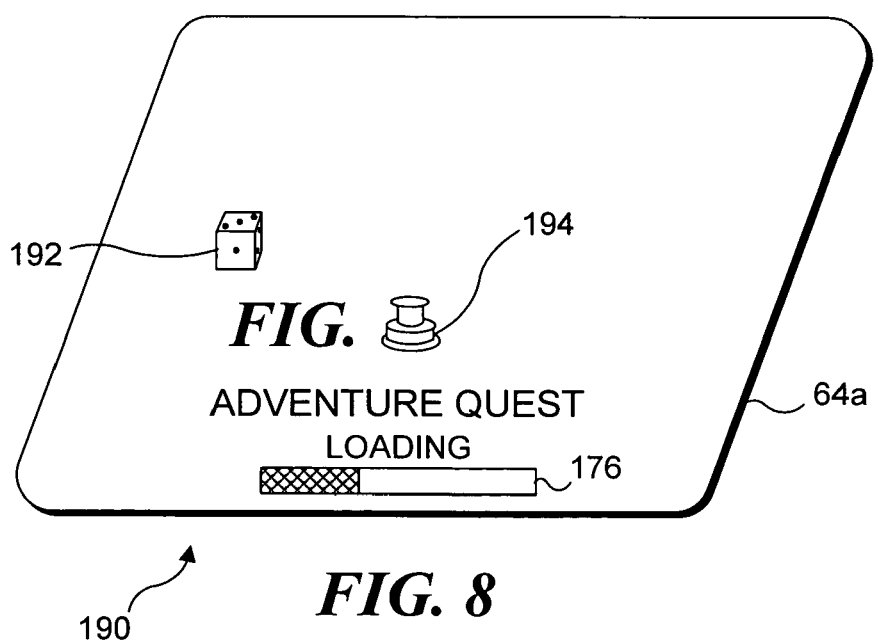
FIG. 8 is an oblique view of the display surface of the interactive display table (the rest of the interactive display table is not included to simplify the drawing), showing how two objects used in an electronic game with which the objects are uniquely associated cause the electronic game to be loaded and executed when the two objects are detected on the display surface.

FIG. 8 illustrates the case where an object such as a die 192 is associated with a plurality of different software applications so that a second object, in this case a user game piece 194 in combination with die 192 comprises a combination of two objects uniquely associated with a single software application. As shown in FIG. 8, an electronic game Adventure Quest is automatically loaded when the IR sensing technology in the interactive display table senses the object identifier of both die 192 and user game piece 194, when these objects are placed on display surface 64*a*. The object identifier of die 192 can be determined by detecting that any of its six faces includes from one to six spots in a die pattern. The object identifier for the user game piece can be based on the shape, or an encoded pattern applied to the bottom of the user game piece. Again status bar 176 indicates the relative progress of downloading the software application (if necessary) that will be executed by PC 20 of the interactive display table to launch the Adventure Quest software application selectively loaded by the user placing the two specific objects on the display surface. Status bar 176 need not be displayed, if the application is stored locally and needs only to be loaded into active memory.

FIG. 9 illustrates an exemplary pattern 200 that is applied to the bottom of an object to serve as an object identifier that is associated with a specific software application. When pattern 200 is detected on or proximate to display surface 64*a* by the reflected IR light from the pattern, the table automatically will launch the software application with which the object identifier represented by the pattern is associated. If not already installed in the local storage of the table, the software application will be downloaded and installed, as explained above.

In the example shown in FIG. 9, a pattern of reflective segments 202 and non-reflective segments 204 are disposed about a center of the object. A start bit 206 indicates where the annular pattern of reflective and non-reflective segments starts, to enable the pattern to be properly recognized. It must be stressed that the exemplary pattern shown in FIG. 9 is one of many different kinds of patterns that can be applied to an object to serve as an object identifier.

Figure 10:
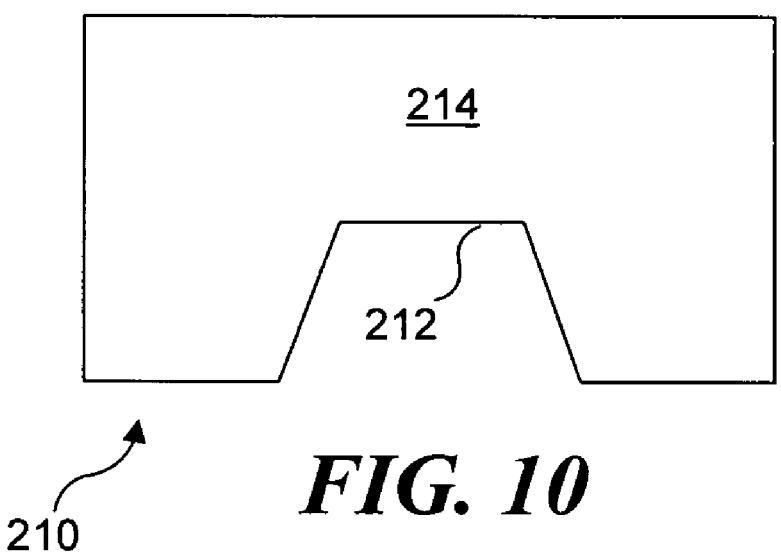
FIG. 10 is a bottom view of an object having a distinctive shape that is detected when the object is placed on the display surface of the interactive display table.

FIG. 10 illustrates how a shape 210 of an object can also serve as an object identifier that is associated with launching a specific software application. Shape 210 is distinguished because of a notch 212 that is included on one side of an otherwise rectangular shape 214. Regardless of the orientation of shape 210, the same software application can be launched. Alternatively, by reorienting notch 212 to face in a different direction relative to a reference line (not shown) so as to present a different shape, a different object identifier may be identified and employed to launch a different software application.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention claimed is:

1. A method for executing a software application in response to at least one object being placed on a display surface of an interactive display table, comprising the steps of:
   (a) identifying at least one object on a display surface of an interactive display table by detecting at least one characteristic of the at least one object, wherein the characteristics include:
      a shape of the object;
      a size of the object;
      a color of the object;
      a location where the object is placed on the display surface, or
      a pattern disposed on the object;
      wherein detecting at least one characteristic of the at least one object includes steps of:
      illuminating said at least one object placed on the display surface with light that passes through the display surface and is incident on said at least one object placed on the display surface;
      receiving light reflected from said at least one object placed on the display surface;
      producing a signal corresponding to the light that is received; and
      processing the signal to determine said at least one characteristic for each object placed on the display surface, to identify each object; and
   (b) determining whether the at least one identified object is uniquely associated with executing only one software application such that:
      upon determining that one identified object is uniquely associated with executing only one software application, the software application is executed; and
      upon determining that a plurality of identified objects are uniquely associated with executing only one software application, the software application is executed.

2. The method of claim 1, wherein upon determining that the software application has not been installed for use, the method further comprises:
   (a) connecting to a predefined remote storage over a network, said predefined storage storing the software application;

(b) downloading the software application from the predefined remote storage over the network;
(c) installing the software application for use with the interactive display table; and
(d) executing the software application.

3. The method of claim 2, wherein the step of installing includes the step of registering the software application.

4. The method of claim 2, further comprising the step of enabling a current user of the interactive display table to enter information relating to one of a debit and a credit account for use in making online purchases, said information being stored locally.

5. The method of claim 4, further comprising the step of enabling the current user of the interactive display table to purchase the software application prior to downloading it, by automatically transmitting the information relating to said one of the debit account and credit account to an entity associated with the remote storage.

6. The method of claim 1, further comprising the step of employing said at least one object within the software application after the software application has been executed.

7. The method of claim 1, wherein said at least one object is related to a function of the software application.

8. The method of claim 1, wherein the at least one object comprises a component provided with the packaging in which the software application was sold.

9. The method of claim 1, wherein if the at least one object is associated with a plurality of software applications, further comprising the steps of:
(a) indicating to the current user the plurality of applications with which said at least one object is associated; and
(b) enabling the current user to select one of the plurality of applications to be executed.

10. The method of claim 9, further comprising the step of indicating a subset of the plurality of software applications when an additional object is placed on the display surface, said subset of the plurality of software applications being associated with said at least object previously placed on the display surface and with said additional object just placed on the display surface.

11. A memory medium on which machine executable instructions are stored for executing the steps of claim 1.

12. A system for executing a software application in response to at least one object being identified, comprising:
(a) an interactive display table including a projector, an object detector, and a display surface on which images produced by the software application are displayed by the projector when the software application is executed;
(b) a memory in which are stored machine instructions; and
(c) a processor that is coupled to the interactive display table and to the memory, said processor executing the machine instructions, which cause the processor to carry out a plurality of functions, including:
(i) identifying at least one object on the display surface of the interactive display table by detecting at least one characteristic of the at least one object, wherein the characteristics include:
a shape of the object;
a size of the object;
a color of the object;
a location where the object is placed on the display surface, or
a pattern disposed on the object;
wherein detecting at least one characteristic of the at least one object includes steps of:
illuminating said at least one object placed on the display surface with light that passes through the display surface and is incident on said at least one object placed on the display surface;
receiving light reflected from said at least one object placed on the display surface;
producing a signal corresponding to the light that is received; and
processing the signal to determine said at least one characteristic for each object placed on the display surface, to identify each object; and
(ii) determining whether the at least one identified object is uniquely associated with executing only one software application such that:
upon determining that one identified object is uniquely associated with executing only one software application, the software application is executed; and
upon determining that a plurality of identified objects are uniquely associated with executing only one software application, the software application is executed.

13. The system of claim 12, wherein if the software application is not stored in the memory because it has not yet been installed on the interactive display table, the machine instructions further cause the processor to:
(a) connect to a predefined remote storage over a network, said predefined remote storage storing the software application;
(b) download the software application from the predefined remote storage over the network;
(c) install the software application for use with the interactive display table; and
(d) execute the software application.

14. The system of claim 13, wherein the machine instructions further cause the processor to register the software application.

15. The system of claim 13, wherein the machine instructions further cause the processor to store information relating to one of debit account and a credit account in the memory, for use in making online purchases, including an online purchase of the software application.

16. The system of claim 15, wherein the machine instructions further cause the processor to enable a current user of the interactive display table to purchase the software application prior to downloading it over the network, by automatically transmitting the information relating to said one of the debit account and credit account to an entity associated with the remote storage.

17. The system of claim 12, wherein the interactive display table further includes a light source disposed under the display surface that illuminates said at least one object placed on the display surface with light that passes through the display surface and is incident on said at least one object, said object sensor comprising a camera that receives light reflected from said at least one object placed on the display surface and produces a signal corresponding to the light that is received, said signal being coupled to the processor, and said machine instructions further causing the processor to determine said at least one characteristic for each object placed on the surface, to identify each said at least one object.

18. The system of claim 12, wherein said at least one object is employed within the software application after the software application has been executed.

19. The system of claim 12, wherein said at least one object is related to a function of the software application.

20. The system of claim 12, wherein said at least one object comprises a component provided with the packaging in which the software application was sold.

21. The system of claim 12, wherein the light source emits infrared (IR) light, and wherein the object detector comprises an IR bandpass filter that transmits IR light, but substantially blocks other light, so that said at least one characteristic of each said at least one object is indicated in an image formed by the object detector using IR light reflected back by the object and received by the object detector after passing through the IR bandpass filter.

22. The system of claim 20, wherein the machine instructions cause the processor to determine a shape of each object placed on the display surface using the image formed by the object detector, said shape comprising a characteristic of the object used to identify the object.

23. The system of claim 21, wherein the machine instructions cause the processor to compare the shape of each object placed on the display surface with a corresponding shape stored in memory and associated with the software program that is to be executed.

24. The system of claim 12, wherein if said at least one object is associated with a plurality of software applications, the machine instructions further cause the processor to:
 (a) indicate the plurality of applications with which said at least one object is associated; and
 (b) enable a user to select one of the plurality of applications to be executed.

25. The system of claim 24, wherein the machine instructions cause the processor to indicate a subset of the plurality of software applications when an additional object is placed on the display surface, said subset of the plurality of software applications being associated with said at least one object previously placed on the display surface and with said additional object just placed on the display surface.

* * * * *